US008819546B2

(12) United States Patent
Balmelli

(10) Patent No.: US 8,819,546 B2
(45) Date of Patent: Aug. 26, 2014

(54) METHOD AND APPARATUS FOR CUSTOMIZING SEPARATION OF CUSTOMER CONCERNS WITHIN MODEL ARCHITECTURES

(75) Inventor: Laurent Balmelli, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 1910 days.

(21) Appl. No.: 11/365,734

(22) Filed: Mar. 1, 2006

(65) Prior Publication Data

US 2006/0224630 A1    Oct. 5, 2006

Related U.S. Application Data

(60) Provisional application No. 60/657,422, filed on Mar. 2, 2005.

(51) Int. Cl.
*G06F 17/00* (2006.01)

(52) U.S. Cl.
USPC .......................... 715/249; 715/209; 715/210

(58) Field of Classification Search
USPC ......................................... 715/249, 209, 210
See application file for complete search history.

(56) References Cited

U.S. PATENT DOCUMENTS

| 2002/0194039 | A1* | 12/2002 | Bhaskaran et al. | 705/7 |
| 2003/0188290 | A1* | 10/2003 | Corral | 717/101 |
| 2003/0216919 | A1* | 11/2003 | Roushar | 704/260 |
| 2005/0096937 | A1* | 5/2005 | Subash et al. | 705/1 |
| 2005/0160103 | A1* | 7/2005 | Raffo | 707/100 |
| 2006/0037019 | A1* | 2/2006 | Austin et al. | 718/100 |

OTHER PUBLICATIONS

Systems Modeling Language (SysML) Specification, version 0.9, Jan. 10, 2005, pp. 1-270.*
Rational Unified Process for Systems Engineering RUP SE1.1, May 2002, A Rational Software White Paper TP 165A, pp. 1-28.*

* cited by examiner

*Primary Examiner* — Nathan Hillery
(74) *Attorney, Agent, or Firm* — Jennifer R. Davis, Esq.; McGinn IP Law Group, PLLC

(57) ABSTRACT

A method for mapping viewpoints and model levels of a first framework to a second framework includes receiving data related to viewpoints and model levels in a first format related to the first framework, mapping the received data in the first format to data related to viewpoints and model levels in a second format related to the second framework. The mapping is performed by organizing the viewpoints and the models in both the first and second formats across at least two orthogonal dimensions.

15 Claims, 8 Drawing Sheets

The RUP-SE viewpoints are projected inside the views created by the intersection of the model levels and the customer viewpoints.

FIGURE 3

| Model levels | Customer viewpoints | | | |
|---|---|---|---|---|
| | Viewpoint 0 | Viewpoint 1 | Viewpoint 2 | Viewpoint 3 |
| Level 0 | <<Views>> Worker Logical | <<Views>> Logical | <<Views>> Logical | <<Views>> proprietary |
| Level 1 | <<Views>> proprietary | <<Views>> Information | <<Views>> proprietary | <<Views>> proprietary |
| Level 2 | <<Views>> Worker Physical | <<Views>> Physical | <<Views>> Physical | <<Views>> proprietary |
| Level 3 | <<Views>> proprietary | <<Views>> proprietary | <<Views>> Geometric | <<Views>> Geometric |

Three stereotypes are created for representing the three notions of our framework: Model level, viewpoint and view.

An alternative to the implementation of the three stereotypes needed to express the framework.

A hierarchy of packages is used to implement the framework.

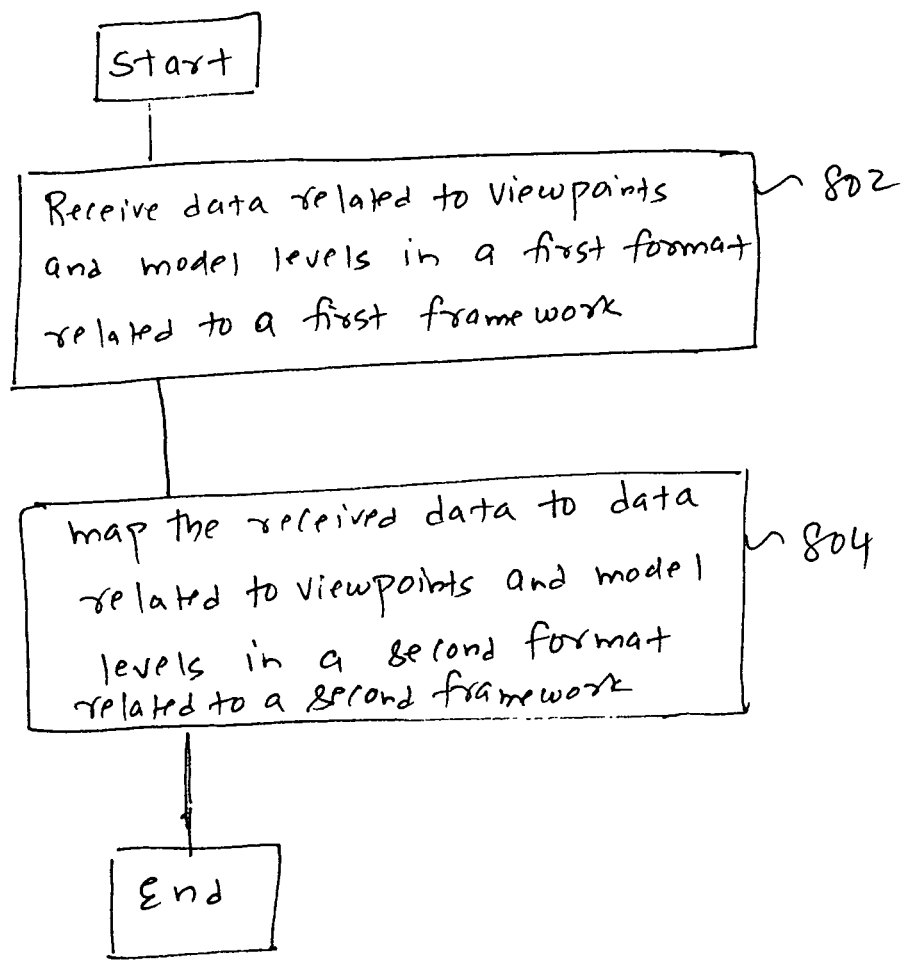

METHOD AND APPARATUS FOR CUSTOMIZING SEPARATION OF CUSTOMER CONCERNS WITHIN MODEL ARCHITECTURES

CROSS-REFERENCE TO RELATED APPLICATIONS

This application is related to the commonly assigned application entitled "Method and Apparatus for Mapping Generic System Engineering Methodology Viewpoints and Model Levels to Specific Viewpoint of Customers" that was filed on Mar. 2, 2005 and is assigned and having Ser. No. 60/657,422, the entire contents of which are hereby incorporated by reference.

BACKGROUND OF THE INVENTION

1. Field of the Invention

Aspects of the invention generally relate to product development and, more specifically, to separation of customer concerns within model architectures.

2. Description of Related Art

No two projects are alike. Project managers often manage several projects at a time and therefore need a process that is flexible and scalable, yet streamlined enough to help keep each project team focused only on what is essential to completing the project successfully.

Given today's sophisticated software systems, it is not possible to sequentially first define the entire problem, design the entire solution, build the software and then test the product at the end. An iterative approach is required that allows an increasing understanding of the problem through successive refinements, and to incrementally grow an effective solution over multiple iterations.

Methodologies for model development such as the Rational Unified Process (RUP) and the Rational Unified Process for System Engineering (RUP-SE) offer a generic framework for describing the structure and behavior of the model. Best-practices dictate that concerns expressed in the model should be separated to better communicate them to stakeholders.

Design methodologies require a means for separating concerns when creating a model in order to clearly express needs of different stakeholders. In the Rational Unified Process (RUP), such is done by introducing the notion of viewpoints. Each of these viewpoints is mapped to a model that expresses a particular level of abstraction, e.g., Use-case model, design model, implementation model, etc. The Rational Unified Process for Systems Engineering (RUP-SE) offers a slightly richer framework by organizing viewpoints and model levels across two orthogonal dimensions.

Model levels allow representation of the model at four different levels of abstraction. However, model viewpoints are organized such that each of the model viewpoints forms a pair with a model level. One way to express such organization is by using a matrix as shown in Table I. In the matrix, each cell is named a view of the system and each view is given a name. In this representation, the model viewpoints are separating concerns and interest of the system's stakeholders.

Although Rational Unified Process (RUP) and Rational Unified Process System Engineering (RUP-SE) provide with such a framework, there still exist some drawbacks with the earlier known approaches and therefore there is a need to overcome the problems associated with prior known approaches.

SUMMARY OF THE INVENTION

Aspects of the invention propose a "one-size-fits-all" separation solution. Inventors have observed that customers often require a customized version of such a framework. In one embodiment, a general method of taking customer concerns into account within typical methodologies such as RUP and RUP-SE is described. Aspects of the invention also explain how the resulting framework can be realized using simple SysML concepts. These concepts enable the user to implement the framework within a SysML (or UML) compliant tool, such as Rational Software Architect.

In various embodiments of the invention described herein, it is assumed that the methodology used is the Rational Unified Process for System Engineering (RUP-SE). However, it will be appreciated that various embodiments described herein are also directly applicable to the RUP framework.

In one embodiment, the framework used to separate concerns is embedded in a methodology applied to develop a model of the system. For example, the model levels are used to support the notion of realization in RUP-SE. This concept states that lower model levels (e.g. Context level) realize requirements established at upper model levels (e.g. Analysis level). The realization of these requirements is achieved using system elements whose design or elicited behavior expresses the requirements. Therefore traceability between levels is maintained by capturing how these system elements meet these requirements or specification.

Separation of concerns across viewpoints is a desired feature. As systems typically express cross-discipline and heterogeneous concepts, e.g. software, different types of hardware disciplines, people, processes, etc., requirements describing the system are equally diverse and their flowdown should desirably be performed within appropriate viewpoints. The notion of "flowdown" is another concept in RUP-SE which describes how requirements are communicated across viewpoints and levels during system development.

The framework, as described in various aspects of the invention, for the separation of concerns in RUP-SE is suitable for addressing the challenges offered by customers. Yet, customers often wish to use specific viewpoints or model level abstractions that are more relevant to their needs.

The problem to address is the mapping of a given customer framework to the one used in RUP-SE. As described above, it is preferable to build a framework (e.g., customer framework) that relates as closely as possible to the one used in RUP-SE in order to retain the applicability of the concepts offered by the methodology.

The solution includes the following steps. First, the model levels of a customer should be mapped to the model levels of the methodology. The second step deals with remapping viewpoints of the methodology with viewpoints of the customer. This mapping is done by comparing the definition of the customer viewpoint and the definition of the viewpoint methodology. In this customized framework, the first level of separation of concerns is dictated by the customer viewpoint. Viewpoints of the RUPSE provide a second degree of separation of concerns that fits the RUPSE methodology.

In one aspect, a method for mapping viewpoints and model levels of a first framework to a second framework includes receiving data related to viewpoints and model levels in a first format, the first format being related to the first framework, mapping the received data in the first format to data related to viewpoints and model levels in a second format, the second format being related to the second framework. The mapping is performed by organizing the viewpoints and the models in both the first and second formats across at least two orthogonal dimensions.

In another aspect, apparatus for mapping viewpoints and model levels of a first framework to a generic second framework includes means for receiving data related to viewpoints and model levels in a first format, the first format related to the first framework, means for mapping the received data in the first format to data related to viewpoints and model levels in a second format, the second format related to the second framework, and wherein the mapping is performed by organizing the viewpoints and the models in both the first and second formats across at least two orthogonal dimensions.

In a further aspect, a method for deploying an application for mapping viewpoints and model levels of a first framework to a second framework is described. The method includes providing a computer infrastructure being operable to receive data related to viewpoints and model levels in a first format related to the first framework; map the received data in the first format to data related to viewpoints and model levels in a second format related to the second framework; and wherein the mapping is performed by organizing the viewpoints and the models in both the first and second formats across at least two orthogonal dimensions.

BRIEF DESCRIPTION OF THE DRAWINGS

The foregoing and other aspects of embodiments of this invention are made more evident in the following Detailed Description of Exemplary Embodiments, when read in conjunction with the attached drawings, wherein:

FIG. 3 shows a matrix where RUP-SE viewpoints are embedded in the views represented by matrix cells by performing a projection operation performed in FIG. 2.

FIG. 8 is a high-level flow diagram for mapping viewpoints and model levels of a first framework to a second framework in accordance with various embodiments of the invention.

DETAILED DESCRIPTION OF THE PREFERRED EMBODIMENTS

Figure 1:
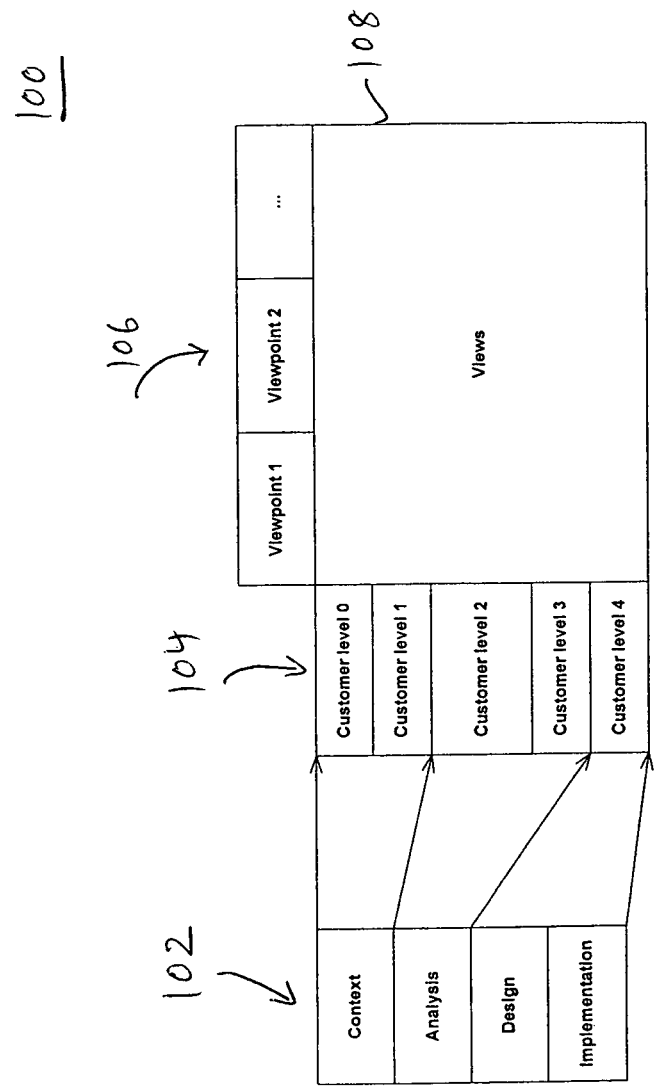
FIG. 1 shows an exemplary schematic wherein mapping of customer levels to RUP-SE level is performed in accordance with an embodiment of the invention.

Mapping of Model Levels:

Referring to FIG. 1, an exemplary schematic mapping customer levels to RUP-SE level is shown. It is assumed that a customer provides both levels and viewpoints. Mapping the customer's levels to the levels in RUP-SE as expressed below.

In RUP-SE, the model levels can be regarded as "ordered", in the sense that it is possible to sort them according to a measure. For example, the levels in RUP-SE measure the level of abstraction of a system. This is often equivalent to measuring maturity of a design since the goal of the mapping methodology is to develop the system. It is also assumed that such an ordering property also exists for the customer levels.

The ordering property allows mapping of the customer levels to the levels in RUP-SE by identifying sets of levels expressing similar measurements on the model (e.g. the abstractness of the model). Special attention may be needed for the case where the mapping requires shuffling the RUP-SE levels.

The mapping of the customer levels 104 to the levels in the RUP-SE 102 results in that the customer levels 104 simply replace the levels in RUP-SE 102 as shown in FIG. 1. Once such replacement is done, application of the flowdown mechanism needs to be handled with care. It would be up to a designer to decide whether the customer levels 104 require more steps than the original RUP-SE framework, or if multiple levels can be aggregated within a single flowdown operation.

Handling Viewpoints:

Continuing to refer to FIG. 1, in contrast to the levels 104, as viewpoints are usually not ordered, it is therefore desirable to handle them differently. A generic approach to mapping the customer viewpoints 106 would be to find N-to-N relationships between the views in RUP-SE 102 (i.e. the intersections of a model levels with the viewpoints) and the customer viewpoints 106. For example, a single customer viewpoint might correspond to a set of disjoint views in the RUP-SE framework 102. While this method allows for the greatest freedom, it is prone to difficulties.

The RUP-SE framework 102 might be not aligned with the form of the requirements that describe the product to be modeled. For example, in the case where the requirements are categorized according to the customer viewpoints, reorganization might be necessary to fit the views mapped to the viewpoint. Further, since the views might be disjointed (therefore not necessarily contiguous in the matrix representation, mapping of customer viewpoints to the RUP-SE framework would likely require modification of the methodology. A possible drawback is the loss of best-practices attached to its application. Also, such a general mapping makes it difficult for a customer to relate to the resulting framework.

Figure 2:
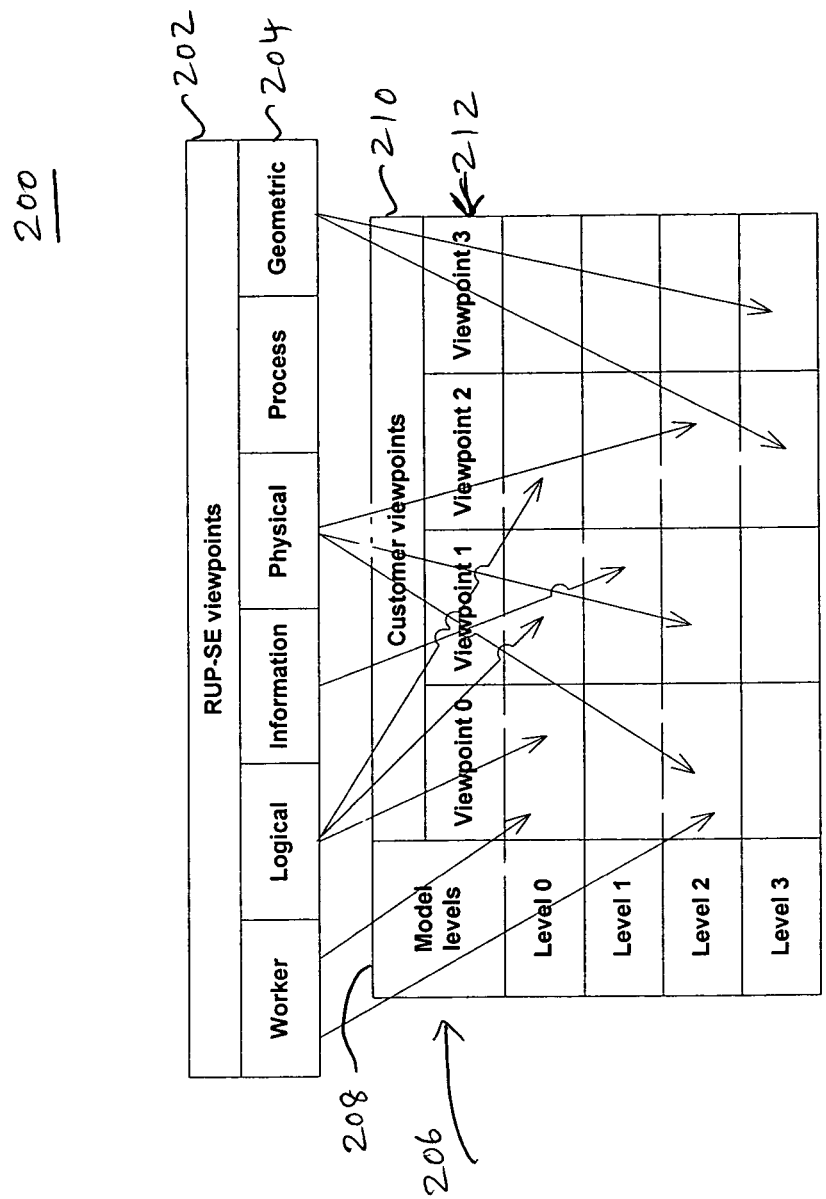
FIG. 2 shows an exemplary schematic wherein the RUP-SE viewpoints are projected inside the views created by the intersection of the model levels and the customer viewpoints in accordance with an embodiment of the invention.

FIG. 2 is a schematic of a framework 200 wherein the RUP-SE viewpoints are projected inside the view created by the intersection of the model levels and the customer viewpoints. In one embodiment, customer viewpoints (212) are efficiently handled by projecting RUP-SE's viewpoints (204) into the customer viewpoints 212. In this embodiment, the notion of projection is used instead of mapping because not all the RUP-SE viewpoints (204) might fit within a given view. To be more accurate, the projection is actually performed within the intersection of a model level (208) and a customer viewpoint (212).

FIG. 3 shows the result of the projection operation performed in FIG. 2. The result of the projection is a new matrix 300 where each view (i.e. matrix cell) is segmented into a set of sub-views. The accuracy of the projection operation is driven by the definitions available for the customer viewpoints 210. These definitions allow a user to determine which RUP-SE viewpoints fit into views 304, 306, and 308 of an initial customer-oriented matrix 302.

It may be possible in some embodiments, that given the customer definitions for its viewpoints, that no RUP-SE viewpoint can be projected into the view. These particular views are denoted by proprietary 310. This might signal needs of the customer for defining specific, i.e. proprietary views. These views might in turn require the elaboration of dedicated extensions to RUP-SE, e.g. industry-specific.

Once the projection is done, the multiple views contained into the matrix cell can be named, as this is done at the original RUP-SE matrix, represented in Table I. The naming can be adapted to the customer (or industry) terminology.

One way to see the projection operation is that it creates RUP-SE (sub-)processes within each customer viewpoint (e.g., one per viewpoint.) The term sub-process is used above because only a subset of the viewpoint might be available in a given customer viewpoint. Global collaboration of these processes as it is in the case of the original RUP-SE framework as in Table I is still desired, yet the processes provide a separation of concern customized for the customer needs.

Regarding the projection operations, creation of a set of RUP-SE processes executing along the customer's viewpoints makes it easy to understand such concepts as realization and Use-Case flowdown still apply in a customized framework. The processes would be aligned with customer requirements provided as input, assuming that the customer requirements are organized according to customer viewpoints. The customized framework thus obtained would likely be more appealing to the customer.

Framework Implementation using SysML:

One possible implementation of a customized framework is performed using semantics provided by the Systems Modeling Language (SysML). The semantics used have some commonalities with the UML2.0 as SysML extends the UML in part and reuses other parts without modification. Therefore, the constructs used in the implementation of the customized framework can be directly reused in any UML project. It will be appreciated that the choice of SysML is yet consistent with RUP-SE framework as a methodology because SysML provides a semantic framework for describing System Engineering models.

Figure 4:
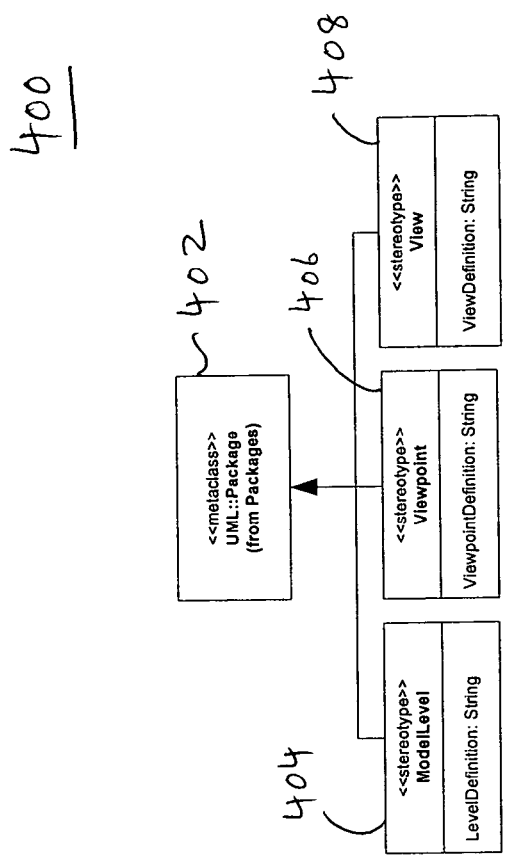
FIG. 4 shows an exemplary schematic wherein three stereotypes are created for representing the three notions of framework (e.g., Model level, viewpoint and view) in accordance with an embodiment of the invention.

FIG. 4 shows an exemplary schematic wherein three stereotypes are created for representing the three notions of framework (e.g., Model level, viewpoint and view) in accordance with an embodiment of the invention. In the framework implementation using SysML as shown in FIG. 4, a first step would be to create stereotypes for representing the notions of model level (404), viewpoint (406) and view (408). A profile for these notions can be sufficient because each of the notions can be seen as a "container" for design elements. Therefore, extending the Package metaclass (402) can be a good solution. Each stereotype provides an attribute to attach a definition. It will be appreciated that an attribute to name any of the notions of the model level 404, the viewpoint 406, and the view 508 is already available as a Package is also a NamedElement.

Figure 5:
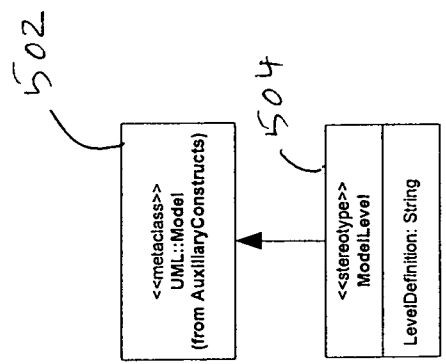
FIG. 5 shows an exemplary schematic disclosing an alternative to the implementation of the three stereotypes needed to express the framework shown in FIG. 4.

FIG. 5 shows an exemplary schematic disclosing an alternative to the implementation of the three stereotypes needed to express the framework shown in FIG. 4 and in accordance with another embodiment of the invention. In this embodiment, a stereotype ModelLevel) 504 from the metaclass Model 502 is defined. SysML inherits a Model element (from UML::AuxiliaryConstructs) that can be used to play the role of a model level. In Rational Software Architect (RSA), it is the Model element that is used to represent a RSA UML model.

Figure 6:
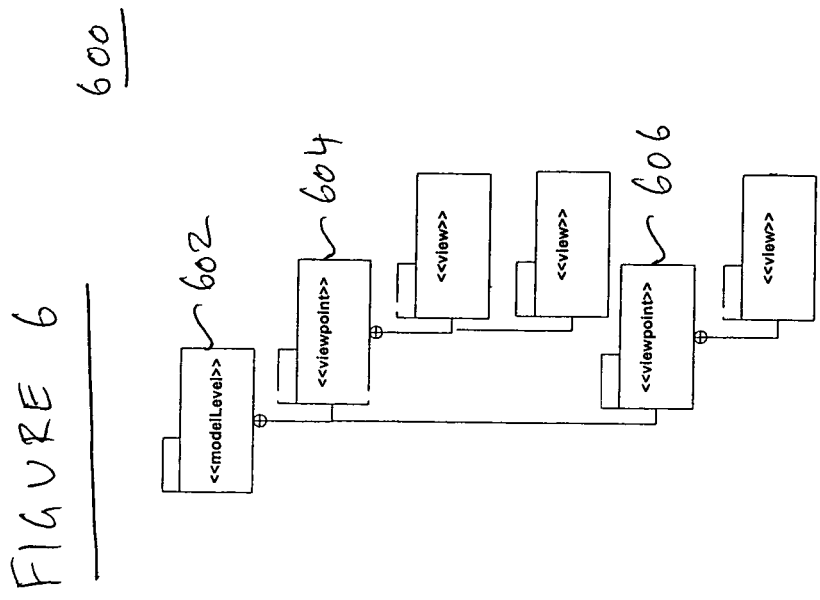
FIG. 6 shows an exemplary hierarchy of packages is used to implement the framework shown in FIG. 1.

FIG. 6 shows an exemplary hierarchy of packages is used to implement the framework shown in FIG. 1 and using the RSA-compliant solution. The framework is implemented using SysML as follows—the views are expressed as a three-level hierarchy of packages which are tagged using the stereotypes as shown in FIG. 4 and FIG. 5. The three-level hierarchy includes the modelLevel 602, the viewpoint 604, and the viewpoint 606.

Figure 7:
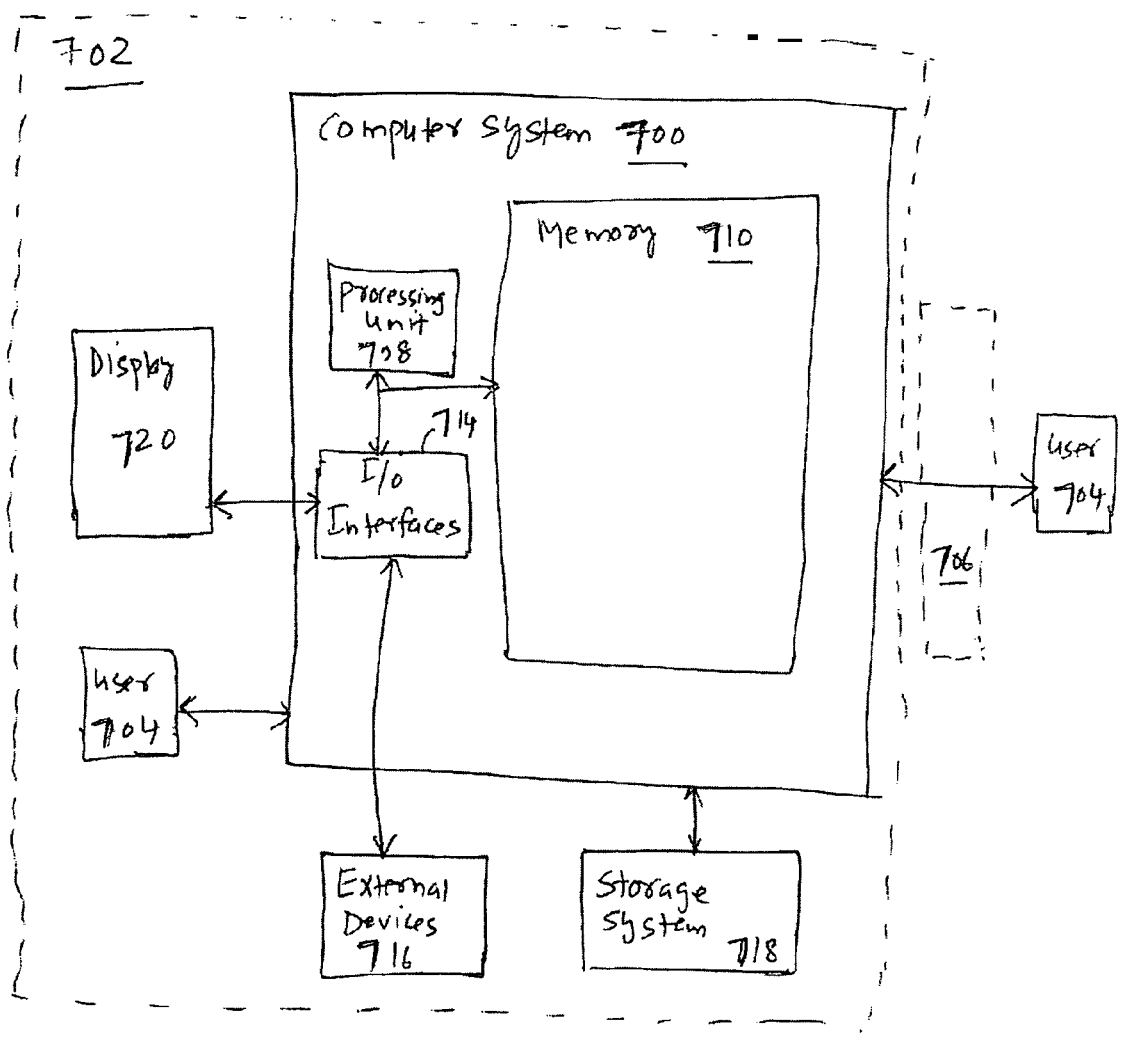
FIG. 7 depicts an illustrative computer system for implementing embodiment(s) of the present invention.

FIG. 7 is a computer system for implementing the various aspects of the invention. Computer system 700 is provided in a computer infrastructure 702. Computer system 700 is intended to represent any type of computer system capable of carrying out the teachings of the present invention. For example, computer system 700 can be a laptop computer, a desktop computer, a workstation, a handheld device, a server, a cluster of computers, etc. It should be appreciated that a user 704 can access computer system 700 directly, or can operate a computer system that communicates with computer system 700 over a network 706 (e.g., the Internet, a wide area network (WAN), a local area network (LAN), a virtual private network (VPN), etc). In the case of the latter, communications between computer system 700 and a user-operated computer system can occur via any combination of various types of communications links. For example, the communication links can comprise addressable connections that can utilize any combination of wired and/or wireless transmission methods. Where communications occur via the Internet, connectivity can be provided by conventional TCP/IP sockets-based protocol, and an Internet service provider can be used to establish connectivity to the Internet.

Computer system 700 is shown including a processing unit 708, a memory 710, a bus 712, and input/output (I/O) interfaces 714. Further, computer system 700 is shown in communication with external devices/resources 716 and one or more storage systems 718. In general, processing unit 708 executes computer program code, such as for mapping viewpoints and model levels from one framework to another, that is stored in memory 710 and/or storage system(s) 718. While executing computer program code, processing unit 708 can read and/or write data, to/from memory 710, storage system(s) 718, and/or I/O interfaces 714. Bus 712 provides a communication link between each of the components in computer system 700. External devices/resources 716 can comprise any devices (e.g., keyboard, pointing device, display (e.g., display 720), printer, etc.) that enable a user to interact with computer system 700 and/or any devices (e.g., network card, modem, etc.) that enable computer system 700 to communicate with one or more other computing devices.

Computer infrastructure 702 is only illustrative of various types of computer infrastructures that can be used to implement the present invention. For example, in one embodiment, computer infrastructure 702 can comprise two or more computing devices (e.g., a server cluster) that communicate over a network (e.g., network 706) to perform the various process steps of the invention. Moreover, computer system 700 is only representative of the many types of computer systems that can be used in the practice of the present invention, each of which can include numerous combinations of hardware/software. For example, processing unit 708 can comprise a single processing unit, or can be distributed across one or more processing units in one or more locations, e.g., on a client and server. Similarly, memory 710 and/or storage system(s) 718 can comprise any combination of various types of data storage and/or transmission media that reside at one or more physical locations. Further, I/O interfaces 714 can comprise any system for exchanging information with one or more external devices/resources 716. Still further, it is understood that one or more additional components (e.g., system software, communication systems, cache memory, etc.) not shown in FIG. 7 can be included in computer system 700. However, if computer system 700 comprises a handheld device or the like, it is understood that one or more external devices/resources 716 (e.g., display 720) and/or one or more storage system(s) 718 can be contained within computer system 700, and not externally as shown.

Storage system(s) 718 can be any type of system (e.g., a database) capable of providing storage for information under the present invention. To this extent, storage system(s) 718 can include one or more storage devices, such as a magnetic disk drive or an optical disk drive. In another embodiment, storage system(s) 718 can include data distributed across, for example, a local area network (LAN), wide area network (WAN) or a storage area network (SAN) (not shown).

Moreover, although not shown, computer systems operated by user 704 can contain computerized components similar to those described above with regard to computer system 700.

It should also be understood that the present invention can be realized in hardware, software, a propagated signal, or any combination thereof. Any kind of computer/server system(s)—or other apparatus adapted for carrying out the methods described herein—is suitable. A typical combination of hardware and software can include a general purpose computer system with a computer program that, when loaded and executed, carries out the respective methods described herein. Alternatively, a specific use computer, containing specialized hardware for carrying out one or more of the functional tasks of the invention, can be utilized. The present invention can also be embedded in a computer program product or a propagated signal, which comprises all the respective features enabling the implementation of the methods described herein, and which—when loaded in a computer system—is able to carry out these methods.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

The present invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device), or a propagation medium. Examples of a computer-readable medium include a semiconductor or solid state memory, magnetic tape, removable computer diskette, random access memory (RAM), read-only memory (ROM), rigid magnetic disk and optical disk. Current examples of optical disks include a compact disk-read only disk (CD-ROM), a compact disk—read/write disk (CD-R/W), and a digital versatile disk (DVD).

Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative methods embodying the principles of the invention. Similarly, it will be appreciated that any flow charts, flow diagrams, state transition diagrams, pseudo-code, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

FIG. 8 is a high-level flow diagram for mapping viewpoints and model levels of a first framework to a second framework. At a step 802 of the methodology, data related to viewpoints and model levels is received in a first format, the first format being related to a first framework (e.g., customer framework). The method then proceeds to a step 804.

At a step 804, the data received at step 802 is mapped to data related to viewpoints and model levels in a second format, the second format being related to a second framework (e.g., generic framework or RUP-SE). The data may exemplarily be mapped via a mapper or mapping unit.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

TABLE I

Model levels, viewpoints and views as proposed in the Rational Unified Process for Systems Engineering.

| | Model viewpoints | | | | | |
| --- | --- | --- | --- | --- | --- | --- |
| Model levels | Worker | Logical | Information | Physical | Process | Geometric |
| Context | Organization view | System context diagram | Enterprise data view | Enterprise locality | Business process | |

TABLE I-continued

Model levels, viewpoints and views as proposed in the Rational Unified Process for Systems Engineering.

| | Model viewpoints | | | | | |
|---|---|---|---|---|---|---|
| Model levels | Worker | Logical | Information | Physical | Process | Geometric |
| Analysis | Generalized System worker view | Subsystem view | System data view | System locality view | System process view | |
| Design | System worker view | Subsystem class view/Software component view | System data schema | Descriptor node view | Detailed process view | |
| Implementation | Worker role specification | Configurations: Deployment diagram with software and hardware system components | | | | |

What is claimed is:

1. A non-transitory computer readable storage medium tangibly embodying a program of machine-readable instructions executable by a digital processing apparatus to perform a method for mapping viewpoints and model levels of a first framework to a second framework, the method comprising:
receiving data related to viewpoints and model levels in a first format related to the first framework;
mapping the received data in the first format to data related to viewpoints and model levels in a second format related to the second framework, the mapping comprising organizing the viewpoints and the models in both the first and second formats across at least two orthogonal dimensions,
wherein the mapping comprises projecting viewpoints of the second framework into the viewpoints of the first framework, and
wherein the projecting results in a matrix having cells, each cell representing a view, and further wherein each cell is segmented into a set of sub-views
the first framework comprises a customer framework, and wherein the second framework comprises a rational unified process software engineering (RU P-SE) framework.

2. A method for deploying computing infrastructure in which computer-readable code is integrated into a computing system, and combines with said computing system to perform a method for mapping viewpoints and model levels of a first framework to a second framework, the method comprising:
loading said computer-readable code in to a memory of the computing system;
receiving data related to viewpoints and model levels in a first format related to the first framework;
mapping the received data in the first format to data related to viewpoints and model levels in a second format related to the second framework, the mapping comprising organizing the viewpoints and the models in both the first and second formats across at least two orthogonal dimensions,
wherein the mapping comprises projecting viewpoints of the second framework into the viewpoints of the first framework, and
wherein the projecting results in a matrix having cells, each cell representing a view, and further wherein each cell is segmented into a set of sub-views
the first framework comprises a customer framework, and wherein the second framework comprises a rational unified process software engineering (RU P-SE) framework.

3. A method for mapping viewpoints and model levels of a first framework to a second framework performed in a processor, the method comprising:
receiving data, performed in the processor, related to viewpoints and model levels in a first format, the first format being related to the first framework; and
mapping the received data, performed in the processor, in the first format to data related to viewpoints and model levels in a second format, the second format being related to the second framework, the mapping comprising organizing the viewpoints and the models in both the first and second formats across at least two orthogonal dimensions,
the mapping comprises projecting viewpoints of the second framework into the viewpoints of the first framework,
the projecting results in a matrix having cells, each cell representing a view, and further wherein each cell is segmented into a set of sub-views,
the first framework comprises a customer framework, and wherein the second framework comprises a rational unified process software engineering (RUP-SE) framework.

4. The method of claim 3, wherein the mapping comprises:
identifying model levels in the first and second frameworks expressing similar measurements; and
comparing a definition of the first framework and a definition of the second framework.

5. The method of claim 3, wherein the model levels of the first framework and the second framework comprise lower model levels and upper model levels, and
wherein the lower model levels comprise a context level and the upper model levels comprise an analysis level.

6. The method of claim 3, wherein the model levels of the second framework are ordered and sorted according to a predetermined measure.

7. The method of claim 6, wherein the ordering of the model levels enables mapping of the model levels in the first framework to the model levels in the second framework.

8. The method of claim 7, wherein the mapping further comprises replacing model levels of the second framework with the model levels of the first framework.

9. The method of claim 3, wherein the model levels of the second framework are configured to measure a level of specification for a model, the level of specification describing how close the model is to a physical realization of a system.

10. The method of claim 3, wherein, for the first framework, the viewpoints are handled in a different manner relative to the model levels.

11. An apparatus for mapping viewpoints and model levels of a first framework to a generic second framework, comprising:

a database to receive data related to viewpoints and model levels in a first format, the first format being related to the first framework;

a mapper, as executed by a processor on said apparatus, to map the received data in the first format to data related to viewpoints and model levels in a second format, the second format being related to the second framework;

wherein the mapper organizes the viewpoints and the models in both the first and second formats across at least two orthogonal dimensions, wherein the mapper is configured to project viewpoints of the second framework into the viewpoints of the first framework, wherein the project viewpoints comprises a matrix comprising cells, each cell representing a view, and further wherein each cell is segmented into a set of sub-views, wherein the first framework comprises a customer framework, and wherein the second framework comprises a rational unified process software engineering (RUP-SE) framework.

12. The apparatus of claim 11, wherein the mapper identifies model levels in the first and second frameworks that express similar measurements.

13. The apparatus of claim 11, wherein the model levels of the first and second framework comprise lower model levels and upper model levels, the lower model levels comprise a context level and the upper model levels comprise an analysis level.

14. The apparatus of claim 11, wherein the model levels of the second framework are ordered and sorted according to a predetermined measure, and ordering of the model levels enables mapping of the model levels in the first framework to the model levels in the second framework.

15. The apparatus of claim 14, wherein the mapper replaces model levels of the second framework with the model levels of the first framework.

\* \* \* \* \*